(No Model.) 2 Sheets—Sheet 1.

W. H. CHAPIN.
GLASS BLOWING MACHINE.

No. 548,605. Patented Oct. 22, 1895.

Witnesses:
J. W. Gayfield
J. H. Bullard

Inventor:
William H. Chapin
by Chapin & Co.
Attorneys (No Model.) 2 Sheets—Sheet 2.

W. H. CHAPIN.
GLASS BLOWING MACHINE.

No. 548,605. Patented Oct. 22, 1895.

Witnesses:
J. L. Garfield
J. H. Bullard

Inventor
William H. Chapin.
by Chapin & Co.

UNITED STATES PATENT OFFICE.

WILLIAM H. CHAPIN, OF SPRINGFIELD, MASSACHUSETTS, ASSIGNOR TO EDWARD D. LIBBEY, OF TOLEDO, OHIO.

GLASS-BLOWING MACHINE.

SPECIFICATION forming part of Letters Patent No. 548,605, dated October 22, 1895.

Application filed April 5, 1895. Serial No. 544,553. (No model.)

*To all whom it may concern:*

Be it known that I, WILLIAM H. CHAPIN, a citizen of the United States, residing at Springfield, in the county of Hampden and State of Massachusetts, have invented new and useful Improvements in Glass-Blowing Machines, of which the following is a specification.

This invention relates to that class of machines for blowing glass into paste molds which comprise several movable or traveling mold-carriers with sectional and separable molds thereon, having in connection with such sectional molds mechanism for automatically opening and closing them, a support for the blowpipe movable in consonance with the molds, and an air-supplying apparatus, all so arranged that each blowpipe as it moves around with the mold will receive therethrough a current of air under suitable pressure to blow the gathering of glass into and to conform to the walls of the mold.

The especial object of this invention is to devise improved means for applying to the paste-lined surfaces of the mold-sections at the time they are opened a sufficient sprinkling of water to keep the mold in good working condition.

To this end the invention consists in the combination, with the mold-carrier having the sectional mold thereon and the means for opening and closing the molds, the support for the removable blowpipe, and the apparatus for supplying the air through the blowpipe as it travels with the mold, of a sprinkler mounted on the mold-carrier adjacent the mold, with a conduit between it and the water-supply with which it is provided, and means for opening the conduit for the passage of water therethrough at the time the mold-sections are opened, such conduit being again automatically closed against the passage of water therethrough at or about the time that the mold-sections are closed.

The improvements are illustrated in the accompanying drawings, in which—

Figure 1:
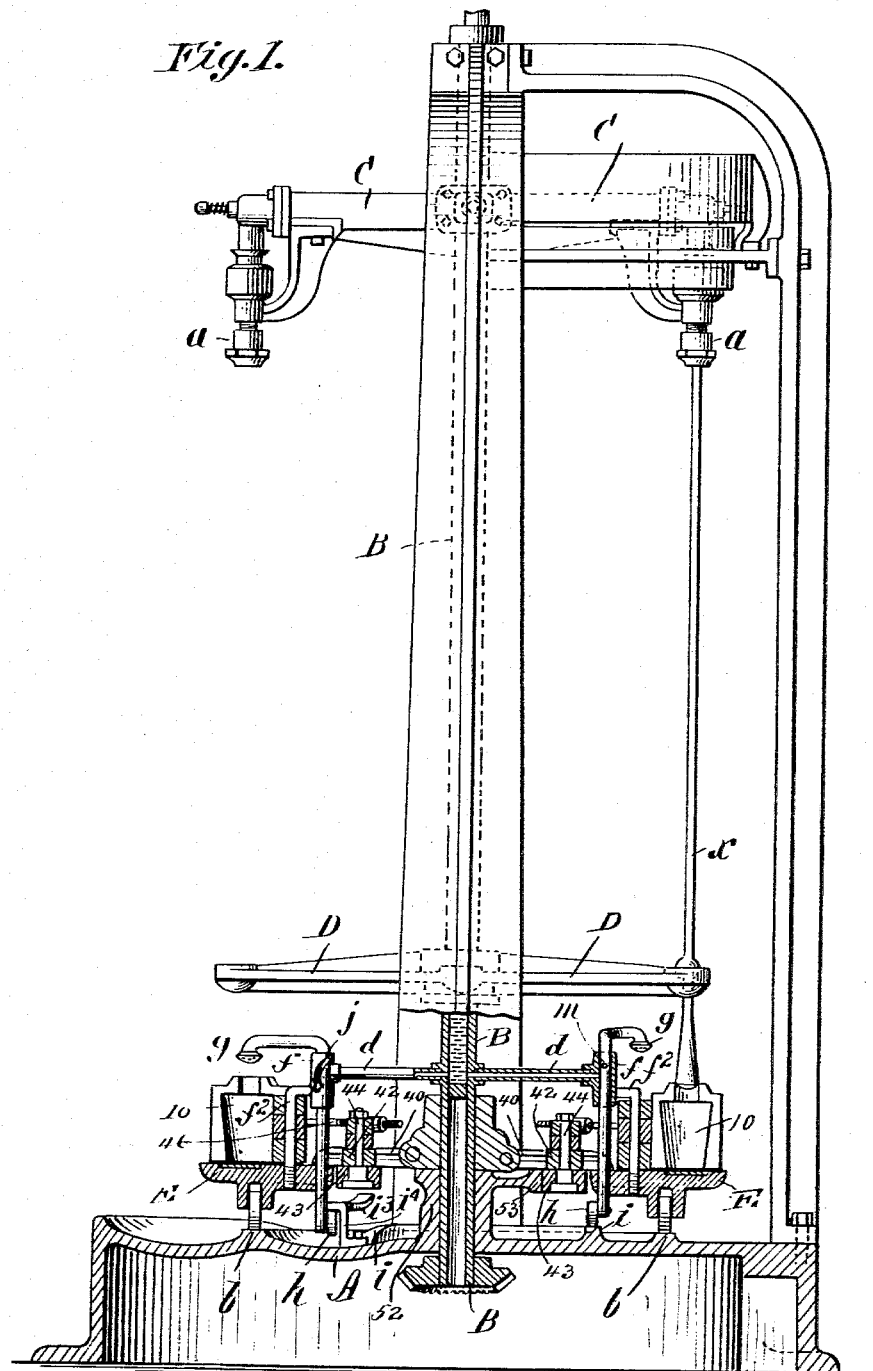
Figure 2:
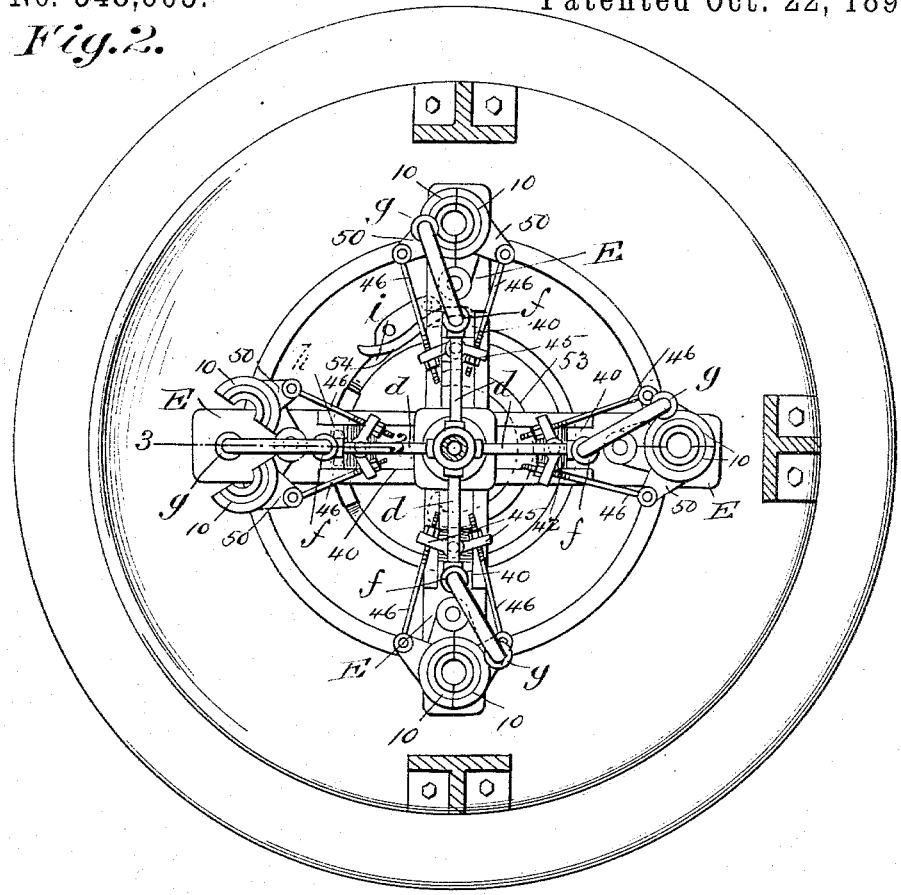
Figures 3, 4, 5, 6:
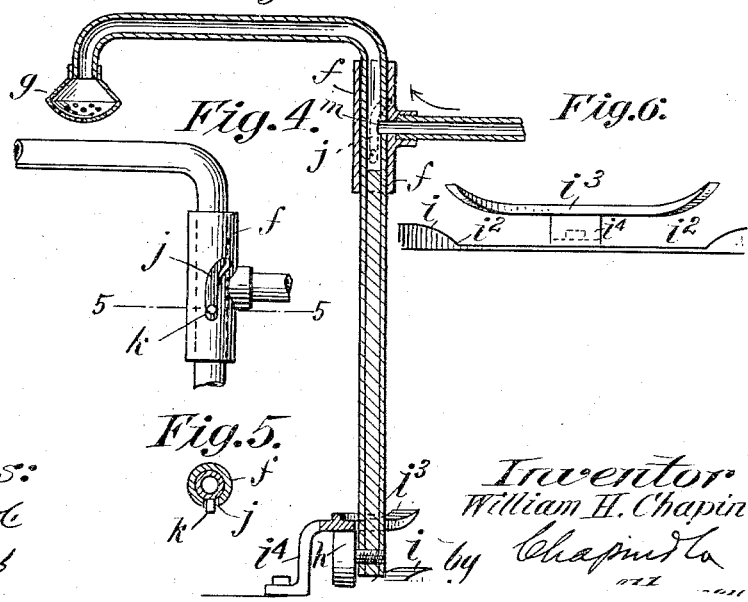

Figure 1 is an elevation of a glass-blowing machine having the lower portion thereof, upon which the present improvements are applied, in vertical section. Fig. 2 is a plan of the machine as seen below the support for the blowpipe. Fig. 3 is a vertical sectional view of novel parts, as taken on the line 3 3, Fig. 2. Fig. 4 is a side view of certain of the parts shown in Fig. 3. Fig. 5 is a cross-section on line 5 5, Fig. 4. Fig. 6 is a view showing the arrangement of cam-surfaces to be hereinafter described.

In the drawings, A represents the base of the machine, having the centrally-rising shaft B, suitably journaled, steadied, and rotated, and having at its upper end the radial air-conduits C, which revolve with the shaft. These conduits have the depending sockets $a$, which receive the upper ends of the removable blowpipes $x$, which intermedially thereof are supported upon the blowpipe-support D. The mold-carriers E are connected to and extend radially from the shaft, they having their revoluble movements around on the track $b$ on the base in unison with the rotation of the shaft and with the revoluble movements of the air-supplying conduits and receptacles above the mold-carriers.

10 10 represent the sections of the separable mold, the same being pivotally mounted on the mold-carriers E to open and close, and they have combined with them opening and closing mechanism which, while in itself constituting no part of the present invention, will be briefly described, as follows: Each mold-carrier is intermediately of its length formed with the slideway 40 for the slide-block 42, which has at its lower side the roller 43, which is mounted to rotate on the vertical stud 44, that is affixed upon and extends above and below the slide-block 42. The angularly-arranged arms 45 are secured firmly and immovably at the upper end of the stud 44 and have engaged therewith the connecting-rods 46, which also have engagements with the radial arms 50 of the mold-sections. The upstanding hub 52 at the central portion of the base has the semicircular flange 53, around on the edge of which the rollers of the slides run as the mold-carriers are revolved. Opposite and located outwardly beyond one end of the semicircular flange 53 is an upstanding cam-rib 54, against which the roller of each slide impinges as the mold-carrier approaches the place in the machine where the mold-sections are to be opened, so as to force the slide inwardly and to cause through the said connection between the slide and the mold-sections the automatic opening of the molds at the proper intervals. As the revoluble travel of each mold-carrier is continued, the roller 43 of the slide is impinged upon by the radially-prominent end or part of the partly-circular flange 53, whereby the slide is caused again to move outwardly and the mold-sections to be closed.

In the employment of the machine for making blown and molded glass objects the blowpipe, with the gathering of glass at its lower end, is placed in engagement on the support D with its upper end in connection with the depending nozzle $a$ of one of the compressed-air receptacles C and with its lower plastic glass-bearing end in proximity to the upper part of one of the separable molds. Now as the blowpipe takes up its travel around in the machine the mold-sections are automatically closed about the lower end of the blowpipe and the blowing and molding ensues until the pipe has nearly completed its circuit in the machine, when the sections are automatically opened to be wet and the pipe and blown object removed, leaving the mold in readiness to receive a fresh blowpipe.

The shaft B is hollow and serves as a conduit for the liquid supplied for wetting the molds when opened. To the said tubular shaft B are connected the horizontal radial conduits $d\ d$, terminating in the axially-vertical hollow hubs $f$. These hubs are steadied or supported by the brackets $f^2$. Within and through each hub is a vertical member, the upper part, essentially, being tubular and turned horizontally and then downwardly directed and provided with a sprinkler $g$ in proximity to the position of the sectional mold. The shank of the said sprinkler-carrying part projects downwardly loosely through an opening in the mold-carrier on which it is mounted, and has at its end a cam-roll $h$, which runs on the track $i$ therefor. The portion of the sprinkler-support which is within the hubbed or socketed end of the conduit $d$ is formed with a cam-groove $j$, in which the radial stud $k$ on the said inclosed portion of the sprinkler-support engages. This so-inclosed portion of the sprinkler-support, which, as aforesaid, is tubular, has the port $m$ normally above and offset from the port which forms the communication between the conduit $d$ and its end hub $f$. Said track $i$ for the lower roller-provided end of the sprinkler-carrier is of a uniform level, except at its part which is adjacent the place in the circuit for the molds where the mold-sections open, and at this place it has the decided depression, as seen at $i^2$, which is overhung by the cam-faced guard $i^3$, for the support of which suitable offset rising-brackets $i^4$ are provided on the base of the machine. Noting the plan view, Fig. 2, it will be perceived that the hollow goose-necks of the sprinkler-supports are swung off from truly-radial lines of the center of the machine, except the one which is over that mold the sections of which are opened.

As the mold-carrier has its bodily revoluble movement, and the roll at the lower end of the sprinkler-support runs down on the depressed part of the track, as it is positively forced to do by the overhanging cam-surfaced guard $i^2$, the roll-support is lowered and partially rotated, bringing the port therein to register with the radial conduit $d$, whereupon the sprinkler is in a position to sprinkle the then-opened mold-sections, and the passage of water is unimpeded thereto and therethrough. The blowpipe having been removed and a new one with a gathering of glass brought to place before the mold-carrier has had much further movement, then as the mold-carrier proceeds around on its course the sprinkler-support is automatically elevated and turned, shutting off the water communication therethrough.

What I claim as my invention is—

1. In a glass blowing machine the combination with the mold-carrier having the sectional opening and closing mold thereon, a removable blow-pipe, a support for the blow-pipe and a receptacle for compressed air in connection with which the blow-pipe may be temporarily placed for supplying a pressure of air through the blow pipe as it travels with the mold, of a sprinkler mounted on the mold-carrier adjacent the mold with a conduit between it and the water supply and means for automatically opening and closing communication between the water supply and the traveling sprinkler, substantially as described.

2. In a glass blowing machine the combination with the mold-carrier having the sectional opening and closing molds thereon and the vertical shaft having the water passage and the radial conduits $d$ leading therefrom, of the hub or socket $f$ having the cam slot and the port, the sprinkler-pipe having the sprinkler, stud $k$, and the port, and having at its depending lower end the cam roller, the track $i$ with the depression and the overhanging guard $i^3$, all substantially as and for the purposes set forth.

WM. H. CHAPIN.

Witnesses:
WM. S. BELLOWS,
HELEN L. COGSWELL.